United States Patent

Glab

[11] 4,232,960
[45] Nov. 11, 1980

[54] SCANNING SYSTEM

[75] Inventor: Edwin F. Glab, Fairport, N.Y.

[73] Assignee: Xerox Corporation, Stamford, Conn.

[21] Appl. No.: 13,098

[22] Filed: Feb. 21, 1979

[51] Int. Cl.³ ............... G03G 15/28; G03B 27/70
[52] U.S. Cl. .................................... 355/8; 355/11; 355/57; 355/60; 355/66
[58] Field of Search ................ 355/8, 11, 60, 66, 57

[56] References Cited

U.S. PATENT DOCUMENTS 3,652,156   3/1972   Lahr et al. .......................... 355/8

*Primary Examiner*—R. L. Moses

[57] ABSTRACT

Briefly, the present invention is concerned with a low inertia scanning system for projecting an image of a stationary object on a flat platen onto a rotating photoreceptor drum. An aperture plate located adjacent the photoreceptor drum moves in a direction opposite the direction of the drum. A carriage disposed between a stationary lens and the photoreceptor drum supports a pair of mirrors. The light image is projected from the lens to one of the pair of mirrors for reflection to the second mirror rotating about a pivot point to scan the image through the aperture onto the photoreceptor drum. During scanning of the platen, the carriage moves in a linear direction toward and away from the photoreceptor drum and together with the rotation of the second mirror maintains a constant magnification ratio. A second pair of mirrors disposed between the platen and the lens is adapted for movement in a linear direction with respect to the flat platen to predetermined positions in cooperation with the shifting of the lens to provide a properly focused light image in a different magnification range.

9 Claims, 4 Drawing Figures

SCANNING SYSTEM

This invention relates generally to an electrophotophotographic printing machine and more particularly concerns a flat platen and stationary document to photoreceptor drum scanning system.

In one type of prior art electrophotographic printing machine, optical elements such as lamps and mirrors scan a stationary object on a flat platen onto a photoreceptor drum at nearly the same velocity as the velocity of the drum. It is difficult, however, to adapt this type of scanning system to higher volume reproduction because of the inertia problems attendant to the scanning optical elements and potential blurring of the image. Another prior art printing machine achieves relatively high volume reproduction using a pivoting mirror for scanning a stationary object on a curved platen surface onto a photoreceptor drum. However, curved platen surfaces have drawbacks, in particular, in copying books or large volume magazines. It would, therefore, be desirable to provide a relatively high volume and low inertia system for scanning a stationary object on a flat platen onto a photoreceptor drum.

It is known in electrophotographic systems to provide higher reproduction rates by minimizing dead space between adjacent images on a photosensitive surface. This is done by moving a scanning aperture adjacent the photosensitive surface in a direction opposite the movement of the photosensitive surface and is often referred to as image precession. If effect, the image is exposed faster than the photosensitive surface rotates. U.S. Pat. No. 3,454,335 assigned to the same assignee as the present invention teaches the use of a slit aperture assembly moving in a direction opposite to the direction of the photoreceptor drum to minimize dead space on the photoreceptor drum. This system involves the projection of images of moving microfilm cards through a stationary lens and mirror system.

Sometimes, a difficulty with this type of system is the additional space required and the bulkiness of the apparatus moving the documents to be copied, as well as the fact that a stationary optical projection system often restricts the system to a narrow depth of focus at the photosensitive surface. U.S. Pat. No. 3,754,882 also assigned to the same assignee as the present invention overcomes the dead space problem in a moving document to photosensitive endless belt scanning system. A scanning lamp and lens arrangement moves in a direction opposite the movement of the document and the endless belt. However, it is sometimes a more complex and space consuming system using a photosensitive endless belt in addition to inertia problems related to a scanning lens. It would, therefore be desirable to eliminate dead space between adjacent images on a photosensitive surface in a low inertia stationary document to rotating drum scanning system.

A significant drawback to the widespread use of a low inertia flat platen to photoreceptor drum system for scanning a stationary document has been the complexity of the optic system to provide optical integrity. In particular, scanning a flat platen with a pivoting mirror introduces "field tilt" or a deviation of the optical axis from a perpendicular relationship with the platen during scan. To avoid this condition, the angle of incidence of the principal ray of the image at the photoreceptor must coincide with the angle incidence of the principal ray to the platen at each instance of scan. Keystone effect also occurs because points on the image plane vary in focus as a result of non-uniform magnification ratio or change in ratio of the object and image conjugate distances during scan. It would, therefore be desirable to provide a low inertia flat platen to rotating drum system for scanning a stationary document that maximizes optical integrity.

There is a need in electrophotographic reproduction machines to be able to vary the magnification range of the system. In particular, there is a need to provide various degrees of image reduction requiring a change of the image to object conjugate ratio. This is usually accomplished by movement of the lens toward the photoreceptor. However, changing the image to object conjugate ratio in turn alters the overall conjugate distance from the object plane to image plane. It becomes necessary, therefore, to modify the overall conjugate distance to maintain proper focus. Changing these conjugate distances often requires complex mechanical linkages and control for movement of various optical elements. It would, therefore, be desirable to provide a relatively simple and economical means for variable magnification in a low inertia flat platen to photoreceptor drum system for scanning stationary objects.

It is therefore, an object of the present invention to overcome or minimize the various problems and disadvantages of prior art scanning systems.

A further object is to provide a simple and economic low inertia high volume scanning system for projecting an image of a stationary object on a flat platen onto a rotating photoreceptor drum with minimal image distortion and minimum deadspace between adjacent images.

Another object of the present invention is to provide a simple and economic variable magnification system in a low inertia, flat platen to photoreceptor drum system for scanning stationary documents.

Further objects and advantages of the present invention will become apparent as the following description proceeds and the features of novelty characterizing the invention will be pointed out with particularity in the claims annexed to and forming a part of this specification.

Briefly, the present invention is concerned with a low inertia scanning system for projecting an image of a stationary object on a flat platen onto a rotating photoreceptor drum. An aperture plate located adjacent the photoreceptor drum moves in a direction opposite the direction of the drum. A carriage disposed between a stationary lens and the photoreceptor drum supports a pair of mirrors. The light image is projected from the lens to one of the mirrors for reflection to the second mirror rotating about a pivot point to scan the image through the aperture onto the drum. During scanning, the carriage moves in a linear direction toward and away from the surface of the photoreceptor drum and together with the rotation of the second mirror maintains a constant magnification ratio. In overcoming field tilt during scan, the second mirror scans the image onto the photoreceptor drum at an angle corresponding to the angle of reflection of the image from the platen. In alternate magnification ranges, the same scanning mirror and translating carriage motions are used and a second pair of mirrors disposed between the platen and the lens are moved in discrete steps to alternate positions.

For a better understanding of the present invention, reference may be had to the accompanying drawings, wherein the same reference numerals have been applied to like parts and wherein.

DETAILED DESCRIPTION OF THE INVENTION

Figure 1:
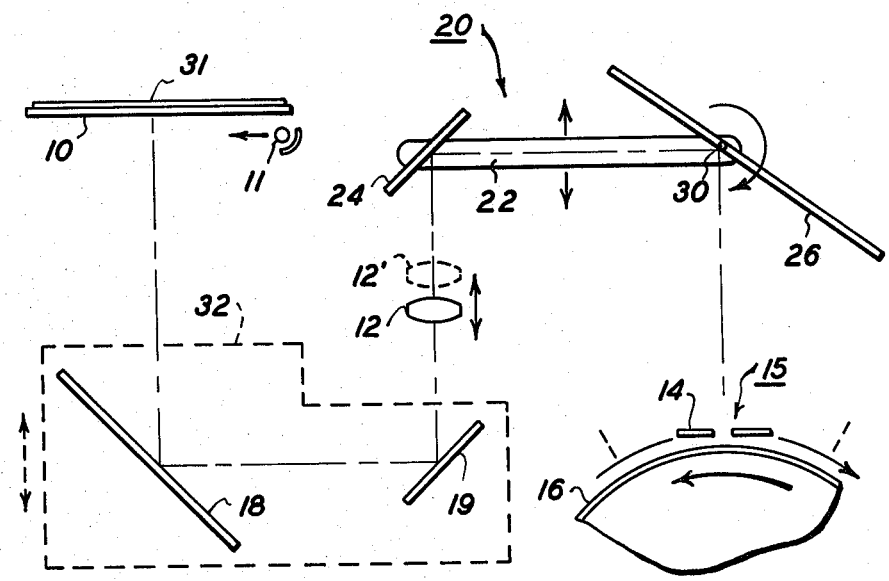
FIG. 1 is a schematic illustration of the present invention.

Referring now to FIG. 1, there is illustrated a stationary document and flat platen to drum scanning system comprising a flat platen 10, a scanning lamp 11, a lens 12, an aperture plate 14 defining aperture 15 and moving in a clockwise direction, a photoreceptor drum 16 rotating in a counter-clockwise direction, object mirrors 18 and 19 disposed along the optic path between the platen 10 and the lens 12 and a mirror cluster generally indicated at 20 disposed along the optic path between the lens 12 and the photoreceptor drum 16. The mirror cluster 20 perferably comprises a carriage 22 supporting mirrors 24 and 26. The mirror 24 is securely fastened to the carriage 22 and the rotating mirror 26 is attached to the carriage 22 for pivotable or rotational motion about pivot point 30. The carriage 22 is constrained to translate in a linear direction toward and away from the photoreceptor drum 16, as shown by the arrows in FIG. 1, in synchronism with the movement of scanning lamp 11 and drum 16. The mirror 26 rotates in a clockwise direction in synchronism with the movement of aperture plate 14 also rotating in a clockwise direction as illustrated.

The lamp 11 scanning from right to left as shown by the arrow in FIG. 1, directs light to a stationary document 31 supported on the platen 10 and the reflected light image is projected through the scanning aperture 15 onto the photoreceptor drum 16 via mirrors 18 and 19, lens 12 and mirrors 24 and 26 comprising mirror cluster 20. In particular, as the lamp 11 scans document 31, there is the simultaneous linear translation of carriage 22 and the rotation of mirror 26 about pivot point 30 to maintain a constant magnification ratio and to compensate for field tilt as will be further explained. It should be understood that stationary lamps could be used in place of moving lamp 11 to illuminate the object.

Figure 2:
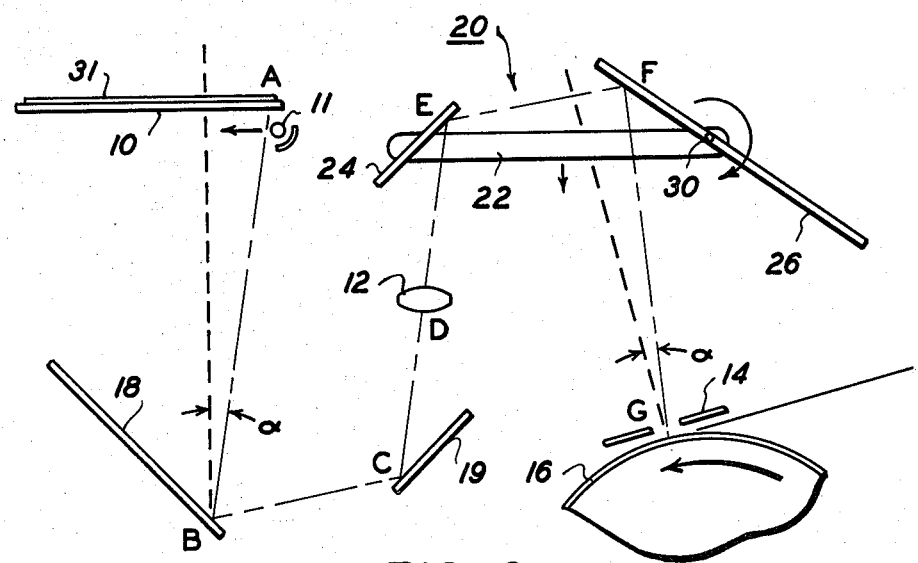
FIGS. 2, 3 and 4 are schematic illustrations of the invention at start of scan, middle of scan and end of scan positions.
Figure 3:
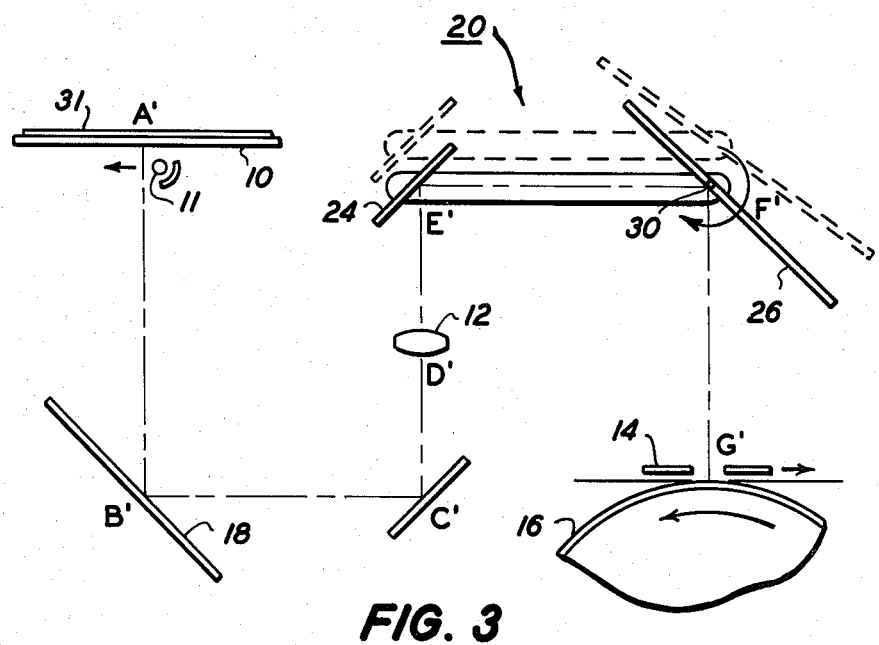
Figure 4:
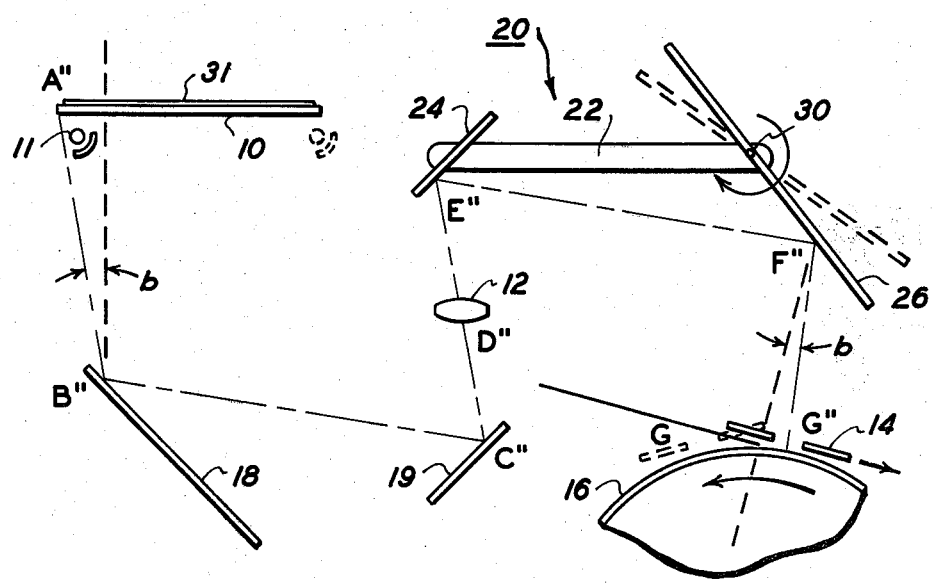

With reference to FIGS. 2, 3 and 4, there is shown the scanning system at start of scan, middle of scan and end of scan positions. In particular, in FIG. 2, illustrating start of scan position, the image is reflected from object mirrors 18 and 19 through the lens 12 to the mirror 24 and reflected from the mirror 24 to pivotable mirror 26 and reflected from mirror 26 through the aperture 15 to the photoreceptor drum 16. As the scanning lamp 30 moves from right to left to the middle of scan position illustrated in FIG. 3, the carriage 22, in synchronism with the scanning lamp 11, translates linearly downward as shown by the arrow in FIG. 2 to the position as illustrated in FIG. 3. In cooperation with the linear movement of carriage 22, mirror 26 pivots in a clockwise direction from the position shown in FIG. 2 to the position as illustrated in FIG. 3. The original or start of scan positions of carriage 22 and mirrors 24 and 26 are shown in phantom in FIG. 3.

Lens 12 remains stationary during the scanning operation. The distance from the object plane at document 31 to the lens 12 is defined as the object conjugate and the distance from the lens 12 to the image plane at the photoreceptor drum 16 is defined as the image conjugate. In order to maintain a constant magnification of the image scanned onto the drum 16, it is necessary to maintain a constant object conjugate to image conjugate ratio. In scanning the flat platen 10 from start of scan to middle of scan, the object conjugate changes from the distance ABCD to the distance A'B'C'D'. To compensate, it is necessary to change the image conjugate distance DEFG in proportion. Therefore, the amount of linear movement of the carriage 22 with allowance for rotation of mirror 26 is selected to maintain the same proportionate change in the image conjugate. Thus carriage 22 moves linearly toward drum 16 in order that the D'E'F'G' distance is proportionate to the A'B'C'D' distance.

Another consideration for optical integrity or image quality is field tilt. That is, each principal ray of the image must intersect the image plane at an angle corresponding to the angle of intersection of the principal ray with the object plane to avoid field tilt. In other words, the angle of intersection at the platen must correspond to the angle of intersection at the plane tangent to the photoreceptor drum. With reference to FIG. 3, the angle of incidence of the principal ray illustrated by line A' B' with the platen 10 is 90°. That is, principal ray A' B' is perpendicular to platen 10 and therefore in this case, the principal ray F' G' is perpendicular to the tangent to the drum surface at point G'. With reference to FIG. 2 principal ray AB intersects the platen 10 at an angle a with respect to the normal to the platen 10 and, therefore, it is necessary for the principal ray FG to intersect the tangent to drum 16 at the point G at an angle a with respect to the normal to the tangent.

That is, in avoiding field tilt, the angle of incidence of the principal ray at the platen 10 with respect to the normal to the platen is equivalent to the angle of incidence of the principal ray at the tangent to the photoreceptor drum 16 with respect to the normal to the tangent. It should be understood, of course, that in scanning from start of scan to middle of scan, carriage 22 continuously moves toward drum 16 changing the image conjugate compensating for object conjugate changes and mirror 26 continuously rotates clockwise providing corresponding angles of incidence of the principal ray with the tangent to the drum 16.

As the lamp 11 continues moving right to left from the mid scan position to the end of scan position, carriage 22 reverses direction and translates in a direction away from photoreceptor drum 16. The carriage 22 moves from the position as shown in FIG. 3 back to the original position as shown in both FIGS. 2 and 4. Mirror 26, however, continues to rotate in a clockwise direction and the aperture plate 14 continues rotation in the clockwise direction to the positions as shown in FIG. 4.

Again the distance of linear movement of the carriage from the middle of scan position to the end of scan position is selected in order to maintain a constant magnification ratio. This movement is merely the inverse of the movement of the carriage from the start of scan position to middle of scan position since the lamp 11 is moving from the center of the platen to the end of the platen opposite start of scan. In effect, the movement of carriage 22 continually satisfies the predetermined magnification ratio, for example, the ratio of distance A" B" C" D" to distance D" E" F" G" as seen in FIG. 1. To compensate for field tilt, the mirror 26 rotates clockwise to the position as shown in FIG. 4. Note that the angle b of the principal ray A" B" with respect to the normal to platen 10 is equivalent to the angle b of the principal ray F" G" with respect to the normal to the tangent to the drum 16 at point G". This angle of incidence at the platen 10 and drum 16 continuously corresponds in moving from middle of scan to end of scan similar to the movement from start of scan to middle of scan.

At the end of scan as seen in FIG. 4, the carriage 22 has already returned to the start of scan position and is ready for the next scanning cycle. The aperture plate 14, the rotating mirror 26, and the lamp 11, however, must be returned to the start of scan position shown in phantom in FIG. 4. In particular, at the end of scan, the aperture plate 14 reverses direction and moves counter clockwise in synchronism with drum 16 to the start of scan position. During this time interval the mirror 26 pivots or rotates counter clockwise and lamp 11 moves left to right to the start of scan positions.

Again, with reference to FIG. 4, during movement of aperture plate 14 to start of scan position, image point G" on drum 16 rotates to location G. Aperture plate 14 likewise follows image point G" to location G. Image point G" defines the point of end of scan or end of image on the drum. In effect, therefore, at start of scan, a new image will be projected onto drum 16 beginning at point G and there is no deadspace between adjacent images on drum 16.

In accord with the present invention, variable magnification is accomplished by movement of lens 12. For example for a predetermined reduction ratio lens 12 is shifted to position 12' as shown in FIG. 1. In this reduction position the lens remains stationary at 12' and the same motions of the carriage 22 and mirror 26 scan the image onto the drum 16. Movement of the lens to position 12' to change the magnification ratio also changes the total conjugate or distance between the object and image planes since:

$$\text{Total Conjugate} = F(M+1) + F(1+1/M)$$

where F = focal length of the lens and M = the magnification ratio. Changes in the total conjugate can be adjusted by changing focal length, for example, by a zoom lens.

Preferably, however, compensation is provided by movement of mirrors 18 and 19. In particular, support 32, illustrated in phantom in FIG. 1, carries mirrors 18 and 19 and moves linearly as indicated by the arrows a predetermined distance from a first to a second position to maintain a constant overall conjugate. After movement of the lens to position 12' and the corresponding movement of support 32, however, the lens 12 and support 32 remain stationary during scanning by carriage 22 and mirror 26. That is, the motions necessary to accomplish scanning are independent of the magnification and the scanning elements move at the same speed regardless of the magnification. This is true irrespective of the method used to achieve variable magnifications. It should be noted that the scanning system can be adapted to any other variable magnification system such as add lens, zoom lens and multiple lens systems.

While there has been illustrated and described what is at present considered to be a preferred embodiment of the present invention, it will be appreciated that numerous changes and modifications are likely to occur to those skilled in the art and it is intended in the appended claims to cover all those changes and modifications which fall within the true spirit and scope of the present invention.

What is claimed is:

1. A scanning system for projecting light images of a stationary object at a predetermined magnification ratio along an optical path onto a curvilinear photosensitive surface moving through an exposure station in a first direction comprising
   a flat platen supporting the object,
   an aperture plate located at the exposure station adjacent the path of movement of the photosensitive surface, the aperture plate enabling only that portion of the light image passing through the aperture to expose the photosensitive surface,
   the aperture plate moving in a direction opposite the direction of movement of the photosensitive surface, and
   an optical system disposed along the optical path between the object and the photosensitive surface, the optical system including first means movable in a linear direction towards and away from the photosensitive surface to alter the length of the optical path and a second means rotatable about an axis to scan the light image.

2. The scanning system of claim 1 wherein the elements are mirrors.

3. The scanning system of claim 1 wherein the optical system comprises a carriage and a pair of mirrors supported by the carriage, the carriage moving in a linear direction toward and away from the photosensitive surface, one of the mirrors rotating about an axis in synchronism with the movement of the aperture plate whereby the moving carriage and rotating mirror scan the image onto the photosensitive surface at a relative uniform magnification with minimal field tilt.

4. The scanning system of claim 3 including a lens disposed at a predetermined position along the optical path and a third mirror and a fourth mirror, the carriage being disposed between the lens and the photosensitive surface, the third and fourth mirror being disposed between the object and the lens.

5. The scanning system of claim 4 for projecting light images of an obect at a second magnification ratio wherein the lens is disposed at a second position along the optical path offset from the first position.

6. The scanning system of claim 5 including a support member and wherein the third and fourth mirrors are carried by the support member, the support member being disposed at a second location between the object and the lens.

7. In a flat platen scanning system for projecting light images of a stationary object at a predetermined magnification ratio along an optical path onto a curvilinear photosensitive surface moving through an exposure station in a predetermined direction the combination of
   a flat platen supporting the object,
   an aperture plate located at the exposure station adjacent the path of movement of the photosensitive surface, the aperture plate enabling only that portion of the light image passing through the aperture to expose the photosensitive surface,
   the aperture plate moving in a direction opposite the direction of movement of the photosensitive surface,
   a stationary lens disposed between the object and the photosensitive surface, and
   a carriage disposed between the lens and the photosensitive surface and movable linearly toward and away from the photosensitive surface, the carriage supporting a first and a second mirror, the first mirror reflecting the light image to the second mirror, the second mirror scanning the light image through the aperture onto the photosensitive surface.

8. The scanning system of claim 7 wherein the first mirror is rigidly secured to the carriage and the second mirror is pivotally mounted on the carriage whereby the moving carriage and pivoting second mirror project light images of the object disposed on the flat platen onto the curvilinear photosensitive surface with a uniform magnification ratio and minimal field tilt.

9. The scanning system of claim 8 wherein the carriage moves from a first position toward the photosensitive surface to a second position and back to the first position and the second mirror rotates in a constant direction during a complete scan of the object.

* * * * *